United States Patent
Kano et al.

(10) Patent No.: US 8,141,425 B2
(45) Date of Patent: Mar. 27, 2012

(54) ANGULAR RATE DETECTION APPARATUS PROVIDING STABLE OUTPUT

(75) Inventors: Shinnosuke Kano, Tokyo (JP); Masayuki Takahashi, Tokyo (JP)

(73) Assignee: Seiko NPC Corporation, Tokyo (JP)

(*) Notice: Subject to any disclaimer, the term of this patent is extended or adjusted under 35 U.S.C. 154(b) by 481 days.

(21) Appl. No.: 12/383,323

(22) Filed: Mar. 23, 2009

(65) Prior Publication Data

US 2009/0241664 A1    Oct. 1, 2009

(30) Foreign Application Priority Data

Mar. 31, 2008  (JP) .................................. 2008-89517

(51) Int. Cl.
*G01C 19/56* (2006.01)
(52) U.S. Cl. ..................................................... 73/504.12
(58) Field of Classification Search ................. 73/504.12
See application file for complete search history.

(56) References Cited

U.S. PATENT DOCUMENTS

| | | | |
|---|---|---|---|
| 5,103,184 A * | 4/1992 | Kapsokavathis et al. ..... 324/672 |
| 7,107,841 B2 * | 9/2006 | Mori ........................... 73/504.12 |
| 7,216,538 B2 * | 5/2007 | Ito et al. ...................... 73/504.12 |
| 7,779,688 B2 * | 8/2010 | Sato et al. ................... 73/504.12 |
| 2006/0027019 A1 * | 2/2006 | Ito et al. ...................... 73/504.12 |
| 2009/0217757 A1 * | 9/2009 | Nozawa ...................... 73/504.12 |
| 2010/0102878 A1 * | 4/2010 | Nagata ............................. 330/86 |

FOREIGN PATENT DOCUMENTS

| | | |
|---|---|---|
| JP | 7-294996 | 11/1995 |
| JP | 2006-010408 | 1/2006 |
| JP | 2007-292680 | 11/2007 |

\* cited by examiner

*Primary Examiner* — Freddie Kirkland, III
(74) *Attorney, Agent, or Firm* — Jordan & Hamburg LLP

(57) ABSTRACT

Disclosed is an angular rate detection apparatus which provides a stable output with high detection accuracy regardless of a fluctuation of a reference voltage accompanying a fluctuation of a power supply voltage. The angular rate detection apparatus includes at least a gyro sensor detection circuit connected to an oscillator, an A/D converter, a digital calculation device, and a reference voltage generation circuit. The gyro sensor detection circuit drives the oscillator, and detects an angular rate acting on the oscillator and outputs an analog detection signal. The A/D converter converts the output analog detection signal into a digital signal. The digital calculation device carries out a calculation based on the converted digital signal. The reference voltage generation circuit supplies a common reference voltage generation circuit supplies a common reference voltage to the gyro sensor detection circuit and the A/D converter.

1 Claim, 1 Drawing Sheet

ANGULAR RATE DETECTION APPARATUS PROVIDING STABLE OUTPUT

TECHNICAL FIELD OF THE INVENTION

The present invention relates to an angular rate detection apparatus (gyro sensor).

BACKGROUND OF THE INVENTION

A gyro sensor is, for example, used for carrying out a hand-shake correction in a video camera, a video correction in a camera-equipped cellular telephone, or an automobile position control, or the like.

In general, a detection circuit of a gyro sensor outputs an analog detection signal in accordance with the size of an angular rate acting on an oscillator connected the detection circuit, and carries out a calculation on the analog detection signal with a digital calculation device such as a CPU or microcomputer. Therefore, an A/D converter is provided between the detection circuit and the digital calculation device. the detection circuit and the A/D converter, being mounted on separate chips, are each supplied with a reference voltage from separate reference voltage generation circuits.

The conversion accuracy of the A/D converter depends on the reference voltage, and the output reference voltage (the output voltage when at rest) and the angular rate detection sensitivity of the detection circuit depend on the reference voltage. In the event that the power supply voltage fluctuates due to power supply noise or the like, and the reference voltage fluctuates along with it, the full scale voltage of the A/D converter fluctuates, with a bad influence on the conversion accuracy of the A/D converter. Meanwhile, the output reference voltage and the angular rate detection sensitivity of the detection circuit are also affected by a reference voltage fluctuation. As it was the above-mentioned, the detection circuit is connected to the reference voltage generation circuit separate from that of the A/D converter, so there has been a problem in that, not coping with the fluctuation in the conversion accuracy of the A/D converter, the detection accuracy is reduced.

As a way of solving this problem, heretofore, in order to cause a gyro sensor detection signal to depend on the power supply voltage, a gyro sensor with a ratiometric function has been proposed which includes a power supply voltage dependence circuit, which generates a power source dependent correction voltage proportional to the power supply voltage, and a multiplication circuit, which multiplies the power source dependent correction voltage with a detection signal output from a signal processing circuit. And a gyro sensor has been proposed which includes a temperature compensation type ratiometric circuit in order to supply a stable output not only under fluctuation in the power supply voltage but also under fluctuation in temperature.

However, as the heretofore known gyro sensor with a ratiometric function has a complex and a large circuit configuration, it has a drawback in that it cannot comply with the miniaturization of apparatus demanded in recent years.

SUMMARY OF THE INVENTION

An angular rate detection apparatus according to the invention includes a gyro sensor detection circuit connected to an oscillator, an A/D converter, a digital calculation device, and a reference voltage generation circuit. The gyro sensor detection circuit drives the oscillator, and detects an angular rate acting on the oscillator and outputs an analog detection signal. The A/D converter converts the analog detection signal output from the gyro sensor detection circuit into a digital signal. The digital calculation device carries out a calculation based on the digital signal. Then, the reference voltage generation circuit supplies a common reference voltage to the gyro sensor detection circuit and the A/D converter.

According to the invention, even in the event that the reference voltage fluctuates along with a fluctuation of the power supply voltage, and the full scale voltage of the A/D converter fluctuates, the output reference voltage and the angular rate detection sensitivity of the gyro sensor detection circuit also fluctuate in response. Consequently, the invention discloses the angular rate detection apparatus which provides a stable output with high detection accuracy regardless of the fluctuation of the reference voltage.

DETAILED DESCRIPTION

Figure 1:
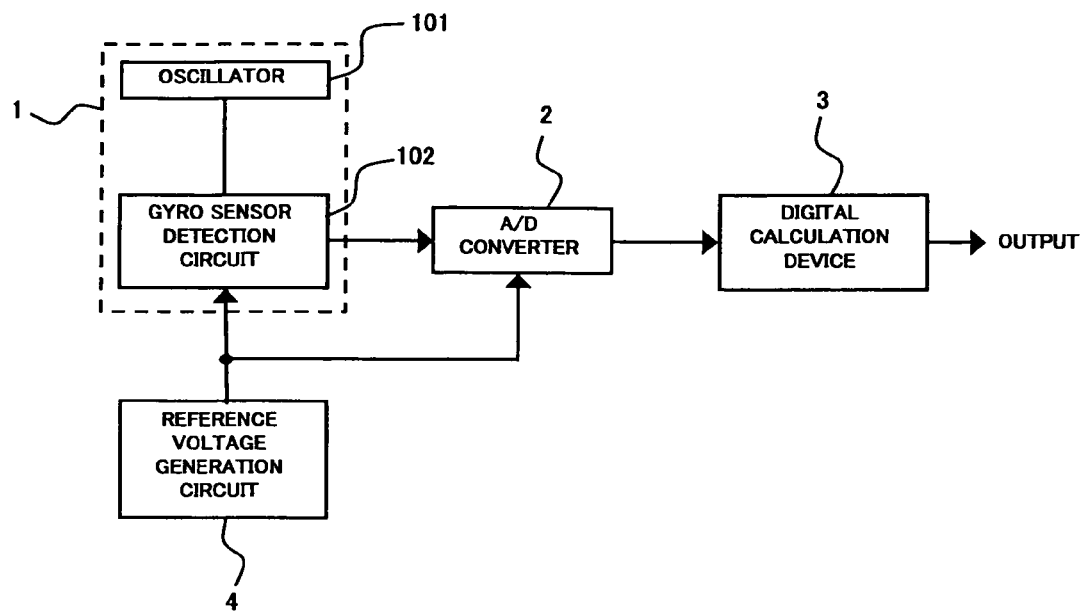
FIG. 1 is a block diagram showing an angular rate detection apparatus according to the invention.

An angular rate detection apparatus of FIG. 1 includes a gyro sensor detection circuit 102 connected to an oscillator 101, which drives the oscillator 101, detects an angular rate acting on the oscillator 101, and outputs an analog detection signal. And the angular rate detection apparatus includes an A/D converter 2 which converts the analog detection signal into a digital signal, a digital calculation device 3, configured of a CPU or the like, which carries out a calculation based on the digital signal, and a reference voltage generation circuit 4. A gyro sensor 1 is configured of the oscillator 101 and the gyro sensor detection circuit 102. And the A/D converter 2 configures, for example, a successive approximation type of A/D converter. Also, the reference voltage generation circuit 4 supplies a reference voltage to each of the gyro sensor detection circuit 102 and the A/D converter 2.

Figure 2:
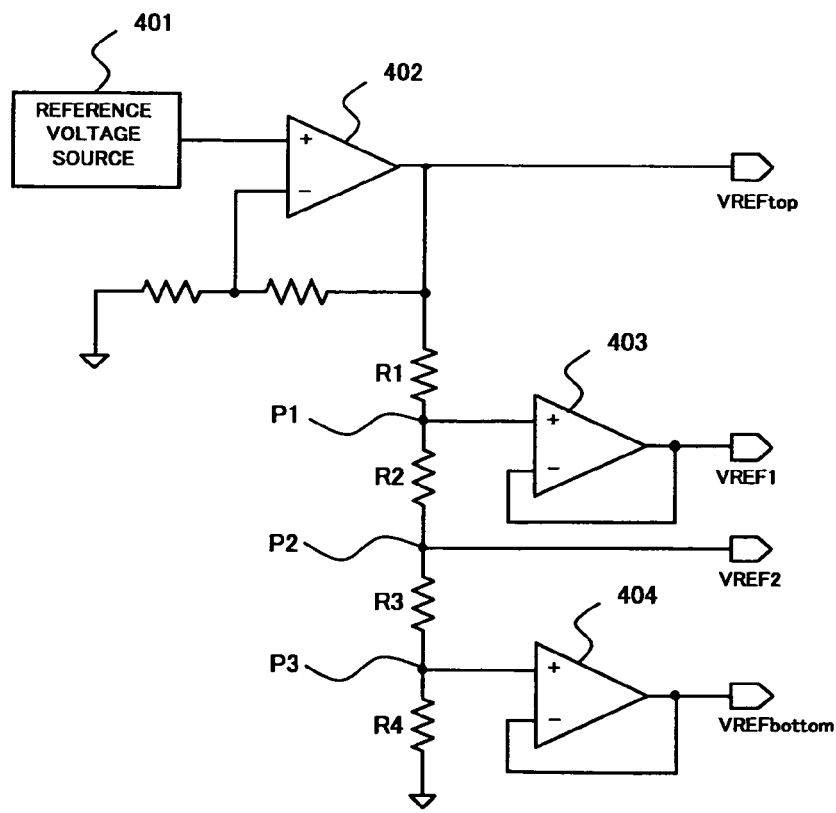
FIG. 2 is a circuit diagram showing a reference voltage generation circuit of the angular rate detection apparatus according to the invention.

FIG. 2 shows the reference voltage generation circuit 4. A reference voltage source 401 being configured of, for example, a bandgap circuit, is connected to the positive input side of an operational amplifier 402. Four resistors R1, R2, R3, and R4 being connected in a ladder formation to the output side of the operational amplifier 402, are configured such as to divide the output voltage of the operational amplifier 402.

A terminal P1 between the resistor R1 and R2 is connected to the positive input side of an impedance conversion operational amplifier 403. The output of the operational amplifier 403, while being returned to the negative input side thereof, is supplied as a reference voltage VREF1 to each circuit to output detection signal in the gyro sensor detection circuit 102. A reference voltage VREF2 is output to each driving circuit in the gyro sensor detection circuit 102 to drive the oscillator from a terminal P2 between the resistor R2 and R3. A terminal P3 between the resistor R3 and R4 is connected to the positive input side of an impedance conversion operational amplifier 404. The output of the operational amplifier 404, while being returned to the negative input side thereof, is supplied as a minimum voltage VREFbottom of the full scale voltage of the A/D converter 2. And a maximum voltage VREFtop of the full scale voltage of the A/D converter 2 is output from the output side of the operational amplifier 402.

For example, in the event that the voltage of the reference voltage source 401 is of a voltage value based on a predetermined power supply voltage, the VREFtop is set to be 2.15V, the VREF1 1.35V, the VREF2 1.08V, and the VREFbottom 0.55V. Herein, in the event that the voltage of the reference voltage source 401 fluctuates, the VREFtop and VREFbottom, which are the full scale voltages of the A/D converter 2, fluctuate along with the voltage fluctuation of the reference voltage source 401. In response to this, the VREF1 and VREF2, which are derived from the reference voltage source 401 and are reference voltages to the gyro sensor detection circuit 102 also fluctuate at the same fluctuation rate as the reference voltage source 401. Consequently, it is possible to obtain a stable output with high detection accuracy, regardless of the fluctuation of the reference voltage. That is, the gyro sensor output when at rest depends on the VREF 1, the sensor sensitivity depends on the voltage difference VREF1-VREF2, and the full scale voltage of the A/D converter 2 depends on the voltage difference VREFtop-VREFbottom. Although the VREF1, VREF1-VREF2, and VREFtop-VREFbottom fluctuate along with the reference voltage fluctuation, as these fluctuation rates are identical, the conversion result does not depend on the reference voltage fluctuation.

It is acceptable that the reference voltage generation circuit 4 according to the invention is shared by the A/D converter 2 and the gyro sensor detection circuit 102 on one chip. Also, it is acceptable to configure in such a way as to provide the gyro sensor detection circuit 102 and the A/D converter 2 on separate chips, and supply the reference voltage from the same reference voltage generation circuit 4.

DRAWINGS

FIG. 1
101 Oscillator
102 Gyro sensor detection circuit
2 A/D converter
3 Digital calculation device
4 Reference voltage generation circuit
FIG. 2
401 Reference voltage source

What is claimed is:

1. An angular rate detection apparatus generating an output signal, comprising:

a gyro sensor;

an A/D converter;

a digital calculation device distinct from the gyro sensor; and a referenced voltage generation circuit;

the gyro sensor including a gyro sensor detection circuit connected to an oscillator, the gyro sensor detection circuit detecting an angular rate acting on the oscillator and outputting to the A/D converter an analog detection signal based on the detected angular rate;

the A/D converter converting the analog detection signal into a digital signal based on the detected angular rate;

the digital calculation device receiving the digital signal and carrying out a calculation based on the received digital signal to generate the angular rate detection apparatus output signal, and the reference voltage generation circuit supplying a common reference voltage to both the gyro sensor detection circuit and the A/D converter.

* * * * *